(12) United States Patent
Katwala et al.

(10) Patent No.: US 7,844,602 B2
(45) Date of Patent: Nov. 30, 2010

(54) METHOD AND SYSTEM FOR ESTABLISHING DOCUMENT RELEVANCE

(75) Inventors: Niraj Katwala, Hayward, CA (US); Nicholas Patton, Hayward, CA (US); Jason Pump, Oakland, CA (US)

(73) Assignee: Healthline Networks, Inc., San Francisco, CA (US)

( * ) Notice: Subject to any disclaimer, the term of this patent is extended or adjusted under 35 U.S.C. 154(b) by 732 days.

(21) Appl. No.: 11/625,224

(22) Filed: Jan. 19, 2007

(65) Prior Publication Data

US 2008/0256049 A1 Oct. 16, 2008

(51) Int. Cl.
*G06F 17/30* (2006.01)
(52) U.S. Cl. .................................. 707/723; 707/748
(58) Field of Classification Search .............. 707/2, 707/3, 5, 999.002, 999.003, 999.005, 709, 707/723, 748
See application file for complete search history.

(56) References Cited

U.S. PATENT DOCUMENTS

| | | | | |
|---|---|---|---|---|
| 5,920,854 | A * | 7/1999 | Kirsch et al. | 707/3 |
| 6,021,409 | A * | 2/2000 | Burrows | 707/102 |
| 6,285,999 | B1 * | 9/2001 | Page | 1/1 |
| 6,493,702 | B1 * | 12/2002 | Adar et al. | 707/706 |
| 7,096,214 | B1 * | 8/2006 | Bharat et al. | 707/708 |
| 7,565,630 | B1 * | 7/2009 | Kamvar et al. | 1/1 |
| 7,584,185 | B2 * | 9/2009 | Jatowt et al. | 1/1 |
| 7,716,223 | B2 * | 5/2010 | Haveliwala et al. | 707/738 |
| 2002/0007285 | A1 * | 1/2002 | Rappaport | 705/2 |
| 2002/0016786 | A1 * | 2/2002 | Pitkow et al. | 707/3 |
| 2004/0054654 | A1 * | 3/2004 | Nomiyama et al. | 707/1 |
| 2005/0198076 | A1 * | 9/2005 | Stata et al. | 707/200 |
| 2006/0069584 | A1 * | 3/2006 | Bates et al. | 705/1 |
| 2006/0095430 | A1 * | 5/2006 | Zeng et al. | 707/7 |
| 2006/0129538 | A1 * | 6/2006 | Baader et al. | 707/3 |
| 2006/0130041 | A1 * | 6/2006 | Pramanick et al. | 717/168 |
| 2006/0195439 | A1 * | 8/2006 | Selberg | 707/5 |
| 2006/0224577 | A1 * | 10/2006 | Hullender et al. | 707/5 |
| 2006/0242129 | A1 * | 10/2006 | Libes et al. | 707/3 |
| 2007/0106627 | A1 * | 5/2007 | Srivastava et al. | 706/20 |
| 2007/0156677 | A1 * | 7/2007 | Szabo | 707/5 |
| 2007/0162448 | A1 * | 7/2007 | Jain et al. | 707/7 |
| 2008/0027936 | A1 * | 1/2008 | Liu et al. | 707/7 |
| 2008/0114756 | A1 * | 5/2008 | Konig et al. | 707/5 |
| 2008/0147631 | A1 * | 6/2008 | Leffingwell et al. | 707/5 |
| 2008/0147649 | A1 * | 6/2008 | Kim et al. | 707/5 |
| 2008/0172371 | A1 * | 7/2008 | Clark et al. | 707/5 |
| 2008/0228675 | A1 * | 9/2008 | Duffy et al. | 706/10 |
| 2008/0275871 | A1 * | 11/2008 | Berstis et al. | 707/5 |
| 2008/0281821 | A1 * | 11/2008 | Chen et al. | 707/6 |
| 2008/0313178 | A1 * | 12/2008 | Bates | 707/5 |

\* cited by examiner

*Primary Examiner*—Charles Rones
*Assistant Examiner*—Phuong-Thao Cao
(74) *Attorney, Agent, or Firm*—SNR Denton US LLP

(57) ABSTRACT

A search engine that provides search results which are ordered, in part, based on an automated analysis of the organizational structure of a group of documents, as indicated by the address of the documents, is disclosed. In one embodiment, a bot crawls various websites analyzing documents, and their organizational structure, in an effort to identify documents that have an implicit high quality based on their inclusion in an index. Accordingly, the search engine provides a greater weight in ranking document relevance to those documents that have been included in certain indexes, such as top ten lists, and A-Z lists.

6 Claims, 3 Drawing Sheets

METHOD AND SYSTEM FOR ESTABLISHING DOCUMENT RELEVANCE

FIELD

The present invention relates generally to the field of information searching and browsing, and particularly to methods and systems for improving the quality of search engine search results by assessing the source of a document in determining its relevance and likely level of quality with respect to a particular search term or terms.

BACKGROUND

A wealth of information is available on the Internet, and particularly that segment of the Internet referred to generally as the World Wide Web. Despite vast improvements in search engines, finding the particular information that one is interested in can still be a challenging and time-consuming task. A variety of methods and techniques have been considered for organizing and indexing the vast number of documents that make up the World Wide Web.

For instance, one approach to organizing documents involves a person, or group of persons, manually assessing the content of documents and then sorting and ranking the documents based on some existing classification. One obvious problem with this approach is that the sheer number of documents to be analyzed, as well as the rate at which new documents are introduced and existing documents change, may require a number of persons analyzing the documents that is cost prohibitive. In addition, with large collections of documents (e.g., the World Wide Web), differences in opinion amongst those analyzing the documents will likely introduce inconsistencies with respect to the assessment of quality and relevance of the documents to a particular topic or category.

Another approach is to utilize so called software bots to "crawl" the Internet while automatically analyzing and categorizing documents based on one or more attributes of the documents. A software bot (sometimes referred to as a "web crawler") is a program designed to perform an automated, repetitive process, such as analyzing a specific attribute of documents. For example, one popular method of ranking the importance or relevance of a document is to assess the number of links in other documents that link or "point to" the document of interest. Accordingly, it is presumed that a document that is frequently referenced by other documents is of high importance relative to a document that is less frequently referenced. Generally, utilizing a bot in this manner can greatly improve efficiency in terms of the time it takes to analyze a number of documents. However, it is not always the case that the results achieved by such bots with respect to a particular subset of documents will correspond with the ranking of the subset of documents provided by the content provider or publisher of the subset of documents.

For example, in certain cases, a particular website will present a subset of documents in a manner that indicates or suggests their relative level of importance. This may be done, for example, by providing a list of documents corresponding to the letters of the alphabet (e.g., an A-Z list) under a particular topic or category. A medical website may, for example, provide a list of alphabetically categorized documents associated with broad categories such as, diseases and conditions, or drugs, or treatment options. For each letter of the alphabet, one or more documents may be provided on a particular topic within the particular category. For instance, under the category for diseases and conditions, there may be presented links to documents on such topics as, arthritis, breast cancer, cholesterol, diabetes, and so on. Although the website may host a large number of documents related to a particular topic under a particular category (e.g., diabetes), the particular document provided under the A-Z list of a given category has been selected by the publisher of the content as being particularly relevant with respect to that topic and category. A software bot designed to analyze and rank documents based on the number of links "pointing to" a document will not pick up on a content provider's ranking of a document implied by the inclusion of that document in an A-Z list, or a similar ranking or categorization of documents.

SUMMARY

A search engine that provides search results which are ordered, in part, based on an automated analysis of the organizational structure of a group of documents, as indicated by the address of the documents, is disclosed. In one embodiment, a bot crawls various websites analyzing documents, and their organizational structure (e.g., directory structure), in an effort to identify documents that have an implicit high level of relevance with respect to a particular topic based on their inclusion in an index. Accordingly, the search engine provides a greater weight when ranking document relevance to those documents that have been included in certain indexes, such as top ten lists, and A-Z lists.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
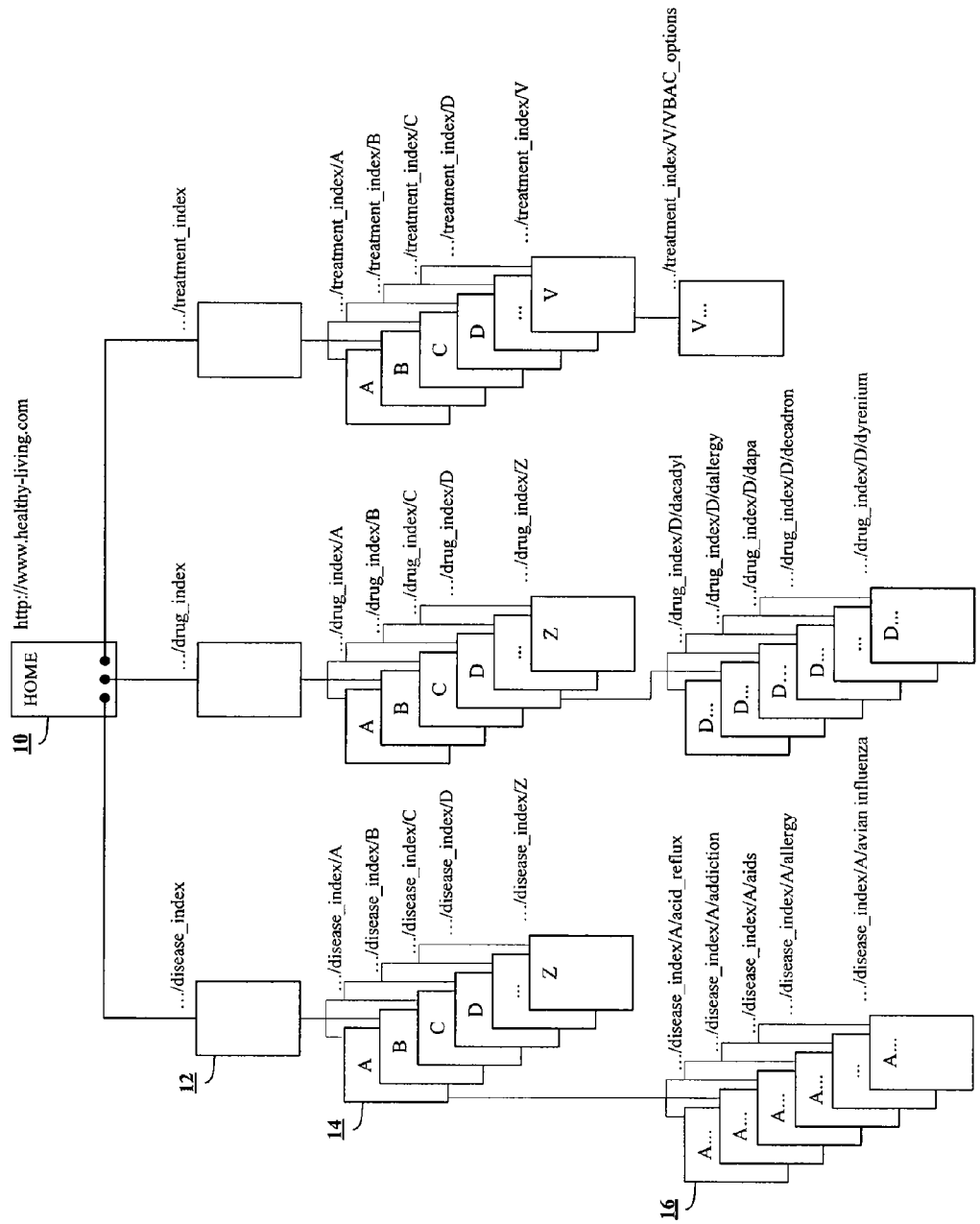
FIG. 1 illustrates an example of the organizational structure of a group of documents that make up a portion of a website hosted by a particular web server.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description. In particular, many of the various aspects and features of the invention are most easily understood by those skilled in the art when conveyed as user interface features. However, those skilled in the art will appreciate that the user interface elements provided are examples, and the invention is not to be limited by those user interface features specifically illustrated in the drawings.

Consistent with an embodiment of the present invention, a search engine utilizes one or more automated processes (referred to herein as a "bot") to analyze and index internet documents that are hosted and served by various web servers. For instance, the bot may be programmed to identify various patterns that indicate when documents are organized in a manner that implies the documents are significant or relevant with respect to a particular topic. For example, if a document is identified by the bot as being included in an A-Z list, or a top ten list, or any similarly organized structure, then that document is presumed to have greater relevance with respect to a particular topic than another document not included in the list. Accordingly, when ranking documents, the search engine may consider the inclusion of a particular document in an A-Z list, or top ten list, as an indication that the document is particularly relevant with respect to a particular topic. In one embodiment of the invention, the search engine assigns a score to each document representing a relevance ranking with respect to a particular keyword. Accordingly, one aspect of the relevance ranking includes a score derived from the resulting analysis of the bot, such that a document included in such a list (e.g., an A-Z list) is ultimately assigned a higher relevance ranking with respect to a particular keyword.

One advantage of the present invention is that it often provides a more accurate relevance ranking of documents, thereby enabling users to more quickly locate the information most relevant to their search. For example, with conventional methods of automated document ranking, the document ranking resulting from human analysis and implied by the inclusion of a document in a listing of particularly relevant documents will be ignored by the automated process ranking the documents. Often in conventional document ranking methods, the automated process of ranking documents is designed to heavily weight the number of links "pointing to" a document. However, it is often the case that web designers link to a website's home page, rather than a specific document hosted at the website. Consequently, when a search engine's document ranking algorithm is heavily weighted based on the number of links to a particular document, often a keyword search will result in search results that include links to home pages of different websites. However, in many cases, a document that is three or four layers deep in a website's document hierarchy may be the most relevant document with respect to a particular keyword. Consistent with an embodiment of the present invention, such documents are given a higher relevance ranking when the documents are included in special organizational structures, such as A-Z lists. Consequently, search results provided by a search engine consistent with the invention will more quickly lead a searcher to the relevant documents.

FIG. 1 illustrates an example of the organizational structure of a group of documents that make up a portion of a website hosted by a particular web server. As illustrated in FIG. 1, the fictitious website has the address (or URL): http://www.healthy-living.com. Accordingly, a user who directs his web browser to the address, http://www.healthy-living.com, will receive a document 10 representing the home page of the website.

In this case, the fictitious website, healthy-living.com, represents a website offering a variety of information about health and medicine. As is conventional in web page design, the home page of the website for healthy-living.com may provide a variety of hypertext links, which, when pressed or selected (e.g., with a pointing device, or mouse), will lead the user to a variety of other web pages or documents. As illustrated in FIG. 1, documents have been arranged in an alphabetical order (e.g., a so-called A-Z list) under various topics. For example, one category or topic is "diseases". The document with reference number 12 and address or URL, http://www.healthy-living.com/disease_index, represents a web page that provides an index of diseases organized by alphabetical order. Accordingly, by selecting a link for the letter A, a user is provided with a web page 14 having an index of diseases beginning with the letter "A". For example, the web page 14 includes links to a variety of documents related to diseases that begin with the letter "A". As illustrated in FIG. 1, one such document or web page 16 has the URL, http://www.healthy-living.com/disease_index/A/acid_reflux, and represents an article about acid reflux.

It is clear from FIG. 1 that an A-Z list is also presented for the categories "drugs" and "treatments" at the example healthy-living.com website. Of course, it will be appreciated by those skilled in the art that the example shown in FIG. 1 represents only one of the many ways in which a group of documents might be organized in alphabetical or numerical order to be presented as an A-Z list or top ten list. A variety of other organizational structures may imply a particular relevance of a group of documents with respect to a particular topic. Moreover, the website presented in FIG. 1 may include a great number of links to other internally hosted documents that may be relevant to one or more of the categories (e.g., diseases, drugs, treatment), but for one reason or another are not included in the A-Z listing.

A premise on which the present invention is based is that the inclusion of a document in a listing, such as the A-Z listing for diseases, implies that the document is more relevant with respect to a particular topic than a document that is not included in the A-Z listing. For instance, the document about acid reflux in the A-Z list for diseases is likely to be particularly relevant to someone performing a keyword search on "acid reflux", and therefore should be provided a higher ranking than another document related to acid reflux that is not included in the A-Z list. Consequently, a search engine that automatically identifies documents that have been selected by a publisher or an administrator of a particular website to be included in a particular organizational structure, such as an A-Z list, will benefit from more accurately ranked documents when providing search results to users.

Figure 2:
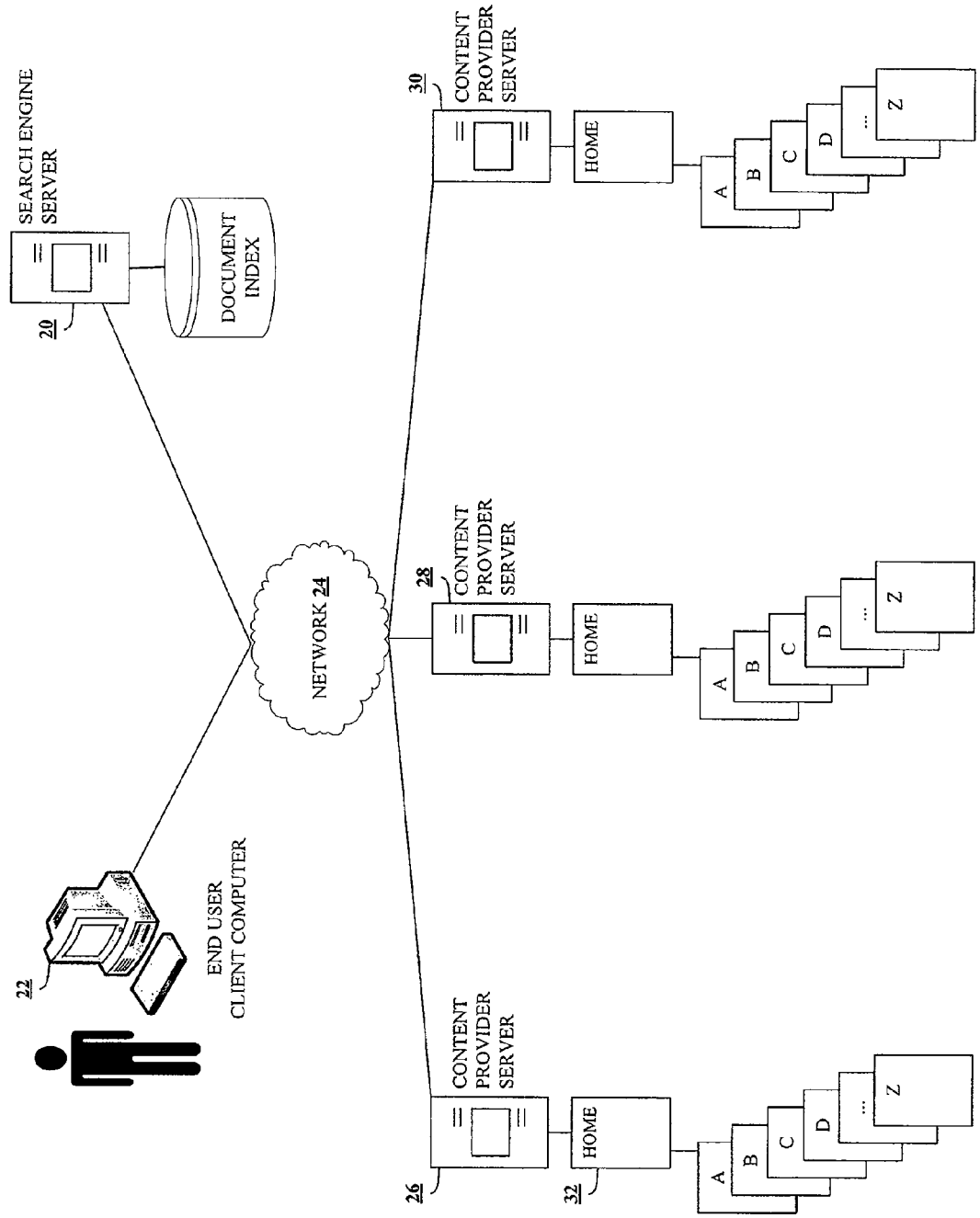
FIG. 2 illustrates an example of a network environment in which a search engine and search bot, according to an embodiment of the invention, might be deployed.

FIG. 2 illustrates an example of a network environment in which a search engine 20 and search bot, according to an embodiment of the invention, might be deployed. As illustrated in FIG. 2, an end user client computer 22 is coupled to a network 24. In addition, three content provider servers 26, 28 and 30, and a search engine server 20 are shown. Each of the three content provider servers 26, 28 and 30 host websites that include groups of documents organized in at least one A-Z list. For instance, the content provider server with reference number 26 has a home page 32 on which an index (e.g., an A-Z list) including links to a group of documents organized according to the index is provided.

According to one embodiment of the invention, a search engine operating on the search engine server 20 analyzes documents hosted by the content provider servers 26, 28 and 30, indexes and ranks those documents according to keywords. For example, each document may be assigned a relevance score with respect to a particular keyword. It will be appreciated by those skilled in the art there are various methods—of which, all are consistent with an embodiment of the present invention—for indexing and ranking documents. For example, the relevance of documents may be ranked, in part, based on the number of other documents that have links to the target document. Similarly, an analysis of the text of the document may be utilized to determine its relevance. The frequency with which a document is requested may be included in determining a document's relevance. However, in contrast to conventional methods of ranking documents, according to an embodiment of the present invention, the overall relevance score assigned to a document is, in part, determined based on whether an automated process (e.g., a bot) identifies the document as being included in an A-Z list, a top ten list, or some other alphabetical or numerical index. Accordingly, the inclusion of a document in such a list is only one aspect of the overall score for relevance.

In one embodiment of the invention, the bot, which executes on the search engine server 20, may be programmed to search specific websites that an administrator of the search engine has identified as being particularly trustworthy and relevant. For example, if the search engine 20 is not a general search engine, but instead, is a search engine 20 customized for a particular use, an administrator may assign the bot certain websites to crawl. For instance, if the search engine is part of a website providing information about health and medicine, an administrator of the search engine who is familiar with several of the more prominent and trustworthy websites hosting content related to health and medicine, may program the bot to target these specific websites. Accordingly, if the bot identifies documents at any of those websites that are included in a particular organization structure, such as an A-Z list, the search engine can assign a relevance score to each document taking into consideration whether the document is included in such a list.

In one embodiment of the invention, the bot has a graphical user interface for configuring and administering the bot. For example, in one embodiment, an administrator of the search engine may specify the particular websites to be analyzed, and particular patterns to be searched for. Accordingly, if a new website is identified manually by an administrator, the administrator can quickly program the bot by entering the address of the new website, and any potential patterns that may be suggestive of an implied ranking of documents by the publisher of the website.

In one embodiment of the invention, the bot analyses the organizational structure of the documents hosted at a particular website by analyzing the URLs or addresses of each document. For example, the bot may search for particular patterns in the naming scheme of documents that indicates the existence of a particular organizational structure, such as an A-Z list. In one embodiment of the invention, the bot may be programmed to automatically notify an administrator of the search engine if the bot encounters a particular pattern that is suggestive of an organizational structure, such as an A-Z list. Accordingly, the administrator may manually verify the structure of the documents hosted at the particular website and then determine whether the particular presentation of the documents warrants a higher relevance ranking by the search engine.

In another embodiment of the invention, the bot may analyze the text of one or more documents in order to determine whether further analysis is necessary. For example, the bot may perform an initial analysis of the home page of a web site to determine the presence of an A-Z list, or other like kind organizational structure. If the textual analysis of the home page indicates the likelihood of such a listing, then the bot will perform further analysis on the URLs of the documents.

Figure 3:
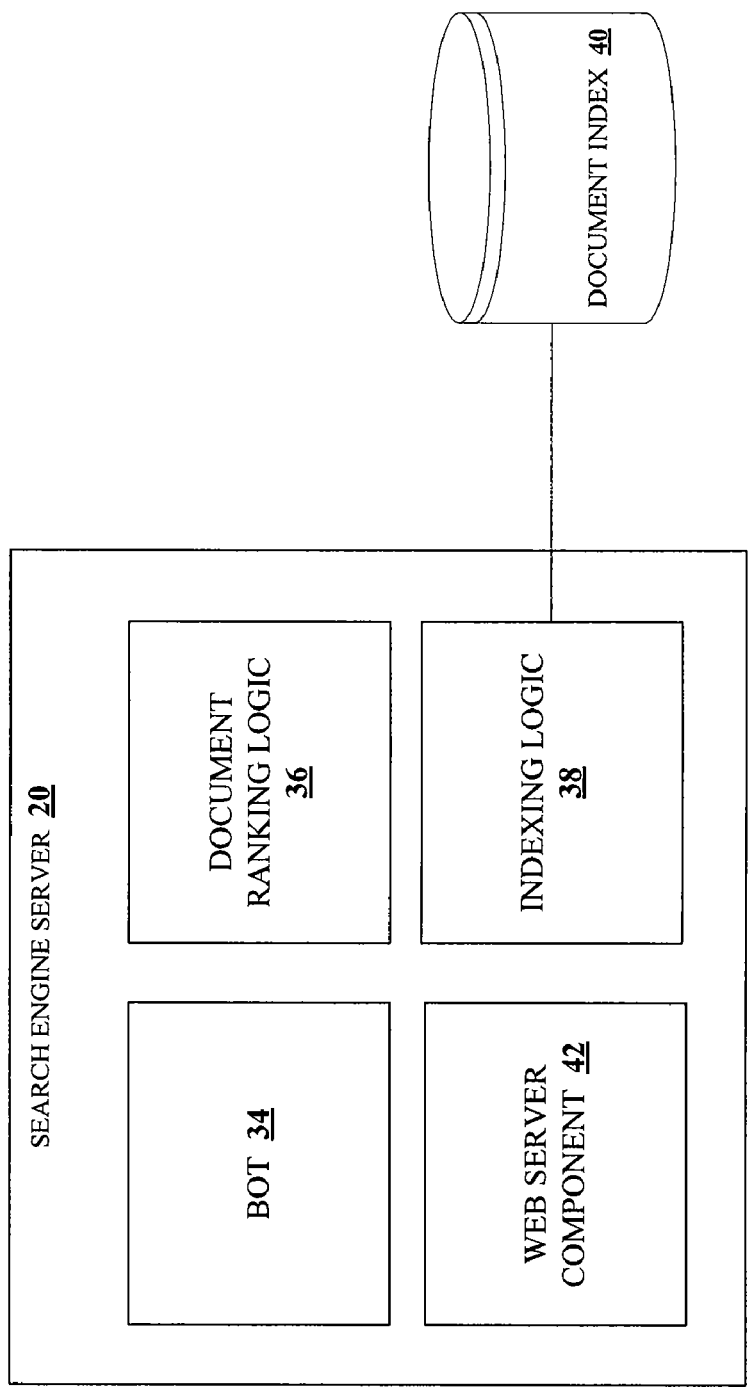
FIG. 3 illustrates a functional block diagram of a search engine server, according to an embodiment of the invention.

FIG. 3 illustrates a functional block diagram of a search engine, according to an embodiment of the invention. As illustrated in FIG. 3, in addition to a bot 34, the search engine server includes document ranking logic 36, document indexing logic 38, a storage device 40 for storing indexed documents, and a web server component 42. Those skilled in the art will appreciate that additional functional components of the search engine server 20, which are not germane to the invention, have been left out to avoid obscuring the invention. In addition, those skilled in the art will appreciate that in various alternative embodiments of the invention, a distributed architecture may be employed, such that the various functions may be provided on separate and distinct hardware.

The web server component 42 serves web pages, for example, to an end user of client computer 22. The end user may submit keyword searches to the search engine using a conventional web browser application, and the search engine server 20 will respond, by providing search results via the web server component 42.

The bot 34 essentially operates in the background analyzing the documents, for example, of the content provider servers 26, 28 and 30 (in FIG. 2). In one embodiment, the bot is designed to actually perform analysis of documents, for example, by analyzing the organizational structure of a group of documents as indicated by the URLs of the documents. However, in an alternative embodiment, the bot may simply copy certain aspects of the documents, or the content of the documents, so that the search engine can analyze the copy of the document at a later time.

As indicated above, the document ranking logic may utilize a variety of document attributes in determining the rank of any document. However, in accordance with an embodiment of the present invention, one aspect or attribute that the document ranking logic considers in establishing an overall relevance weighting or score is the inclusion of a document in a particular organizational structure, such as an A-Z list.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as a set of instructions stored on a computer-readable medium. The scope of the invention is defined by the claims and their equivalents.

What is claimed is:

1. A computer-implemented method comprising:

automatically analyzing, with a bot, documents hosted at respective sources to determine whether respective groups of said documents are maintained in respective organizational structures at said respective sources, said organizational structures indicating an implied relevance of the documents with respect to topics associated with said organizational structures, said implied relevance being higher for those documents determined by said bot as being maintained within a respective one of the organizational structures than for those documents not so included in any of the organizational structures, wherein said organizational structures include an index which represents an arrangement of documents in alphabetical or numerical order;

obtaining, with a search engine and responsive to a keyword search, search results that include one or more of the documents; and organizing the search results, at least in part, based on a weighting scheme that takes into consideration a score derived from said implied relevance.

2. The computer-implemented method of claim 1, wherein analyzing the documents includes analyzing a directory structure associated with an addressing scheme of the documents.

3. The computer-implemented method of claim 1, wherein analyzing the documents comprises analyzing content of one or more documents to identify text suggestive of the implied relevance of the documents.

4. The computer-implemented method of claim 3, wherein said text is suggestive of an indexing based on an alphabetical or numerical order.

5. The computer-implemented method of claim 1, wherein the respective sources include servers, hosting respective websites.

6. The computer-implemented method of claim 1, wherein the search results comprise links to documents satisfying said keyword search, and said links are presented in an order corresponding to an overall score based on said weighing scheme.

* * * * *